(12) United States Patent
Gerhards et al.

(10) Patent No.: US 6,192,852 B1
(45) Date of Patent: Feb. 27, 2001

(54) CRANKCASE FOR AN INTERNAL-COMBUSTION ENGINE

(75) Inventors: Ingo Gerhards, Stuttgart; Juergen Lang, Backnang; Klaus Schnarrenberger, Grossbottwar, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/265,959

(22) Filed: Mar. 11, 1999

(30) Foreign Application Priority Data

Mar. 11, 1998 (DE) ................................. 198 10 464

(51) Int. Cl.$^7$ ................................................. F02F 7/00
(52) U.S. Cl. ................................. 123/195 R; 123/195 H
(58) Field of Search ........................... 123/195 R, 195 H, 123/193.2

(56) References Cited

U.S. PATENT DOCUMENTS

| | | | |
|---|---|---|---|
| 5,150,675 | * 9/1992 | Murata | 123/195 H |
| 5,203,854 | * 4/1993 | Nilsson et al. | 123/195 R |
| 5,299,871 | * 4/1994 | Hancock | 123/195 R |
| 5,404,847 | * 4/1995 | Han | 123/195 H |
| 5,463,991 | * 11/1995 | Krothy et al. | 123/195 R |
| 5,562,073 | * 10/1996 | Van Bezeij et al. | 123/195 R |
| 5,651,337 | * 7/1997 | Regueiro | 123/195 H |

FOREIGN PATENT DOCUMENTS

| | | |
|---|---|---|
| 35 42 137 C2 | 5/1986 | (DE) . |
| 0 695 866 A1 | 7/1996 | (EP) . |
| 2151303 | 7/1985 | (GB) . |

* cited by examiner

*Primary Examiner*—John Kwon
(74) *Attorney, Agent, or Firm*—Evenson, McKeown, Edwards & Lenahan, P.L.L.C.

(57) ABSTRACT

A crankcase for an internal-combustion engine is constructed with a crankcase top and bottom sections made of a light-metal material. Bearing points for a crankshaft and at least one cylinder space are provided. In the region of the bearing points for the crankshaft, respective parts are cast into the crankcase bottom and top sections. The cast-in parts are constructed of a material with a higher modulus of elasticity and a lower coefficient of thermal expansion than the light metal material for the crankcase bottom and top sections. The cast-in parts are constructed for each bearing point as separate, spatially mutually separated members.

17 Claims, 3 Drawing Sheets

CRANKCASE FOR AN INTERNAL-COMBUSTION ENGINE

BACKGROUND OF THE INVENTION

This application claims the priority of 198 10 464.2, filed Mar. 11, 1998, the disclosure of which is expressly incorporated by reference herein.

The present invention relates to a crankcase for an internal-combustion engine having crankcase top and bottom sections. Furthermore, the present invention also relates to a process for producing a crankcase for an internal-combustion engine.

In internal-combustion engines whose crankcase top section and crankcase bottom section are made of a light-metal material, such as aluminum or magnesium, problems frequently occur at the bearing points for the crankshaft made of an iron material because the bearing play and the bearing shape change when the temperature changes because of the different coefficients of thermal expansion of the crankcase material and of the crankshaft material. The bearing bore enlarges as the temperature increases, specifically by a much larger factor than the factor of the enlargement of the crankshaft.

Thus, with rising temperatures, there is an increased bearing play between the bearing bore in the conventional crankcase and the crankshaft situated in the bearing bore, which leads to high oil throughputs and to a falling oil pressure, to increasing running noises and to a decreasing load bearing capacity in the lubrication gap of the crankshaft bearing bores. This results in the further disadvantage that, in the case of such crankcases made of light-metal materials, because of the different coefficients of thermal expansion of the crankshaft and of the crankcase, the diameters of the crankcase bearing bore and of the crankcase, as a rule, must be designed such that the crankshaft will jam in its bearing at very low temperatures.

Furthermore, the relatively low stability of the known crankcases is disadvantageous which, particularly with threaded bores for cylinder head bolts and main bearing bolts, results in an overdimensioning of the bores and the associated bolts in order to achieve a sufficient load bearing capacity of the threads.

DE 35 42 137 C2 attempts to solve the problem of the different expansion of the crankcase and of the crankshaft at rising temperatures as well as the connected thermal stressing of the components. Specifically, a crankcase top section made of light metal is equipped with a bearing cap made of gray cast iron which therefore is to serve as a crankcase bottom section. With respect to its thermal expansion behavior, the material of this bearing cap corresponds essentially to that of the crankshaft.

Although this attempted solution results in a slightly lower bearing play as the result of the very different coefficients of thermal expansion of the crankcase top section and of the bearing cap, tensions occur at rising temperatures and a bearing bore cross-section is obtained which deviates considerably from the ideal circular shape. As mentioned above, this, in turn, leads to high oil throughputs and a falling oil pressure.

EP 0 695 866 A1 describes another crankcase for an internal-combustion engine in which a gray cast iron part, which determines the running surface for the piston as well as the bearing points for the crankshaft, is situated in an aluminum casing. In internal-combustion engines with several cylinders, a continuous base block which is made of gray cast iron is therefore obtained to provide, on one hand, a bearing of the crankshaft and, on the other hand, a running surface for each piston.

This just-described known crankcase has the disadvantage of large differences with respect to the coefficients of thermal expansion of the gray cast iron base block and of the aluminum casing. Along the entire length of an internal-combustion engine having several cylinders, when the temperature rises, such expansions and deformations may occur that, as a result, the function of the internal-combustion engine can be considerably impaired. If such a deformation is not possible, the entire crankcase may break.

Another disadvantage of this known crankcase is the fact that the running surface for the piston is made of the same gray cast iron material as the entire base block and therefore no tribological optimum exists with respect to the piston running surface and the piston rings. If, in contrast, the material of the base block is selected according to tribological aspects, stability cannot be optimized.

SUMMARY OF THE INVENTION

An object of the present invention is to provide a crankcase for an internal-combustion engine which represents a satisfactory solution with respect to its thermal expansion characteristics and its stability values as well as concerning the tribology with respect to the piston.

According to the invention, this object has been achieved by providing a crankcase having a crankcase bottom section made of a light-metal material, a crankcase top section made of a light-metal material, bearing points for a crankshaft, at least one cylinder, cast-in parts which, in each case, in the region of the bearing points for the crankshaft are cast in the crankcase bottom section and in the crankcase top section, in that the cast-in parts are constructed of a material with a higher modulus of elasticity and a lower coefficient of thermal expansion than the light-metal material for the crankcase bottom section and the crankcase top section, the cast-in parts are constructed for each bearing point as separate, spatially mutually separated members.

As the result of the high modulus of elasticity of the material of the cast-in parts, the stability and the bearing capacity of the entire crankcase is increased considerably. Transmission of tensions or expansions, which may occur in the cast-in part, over the entire length of the crankcase is avoided because the cast-in parts are provided only at the bearing points and have no axial connection with one another.

As the result of the coefficient of thermal expansion of the cast-in parts being lower than that of the crankcase top and bottom sections and consequently being closer to the coefficient of thermal expansion of the crankshaft, a bearing point or bearing bore for the crankshaft is obtained which, also at higher temperatures, because of the concentrically extending thermal expansion, has a very uniform roundness and a uniform lubrication gap, which results in lower oil throughputs and in a constant oil pressure.

The cast-in parts are constructed such that the bush for the piston running surface can be selected as required since the bushes are not integrated in the cast-in part.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWING

Figure 1:
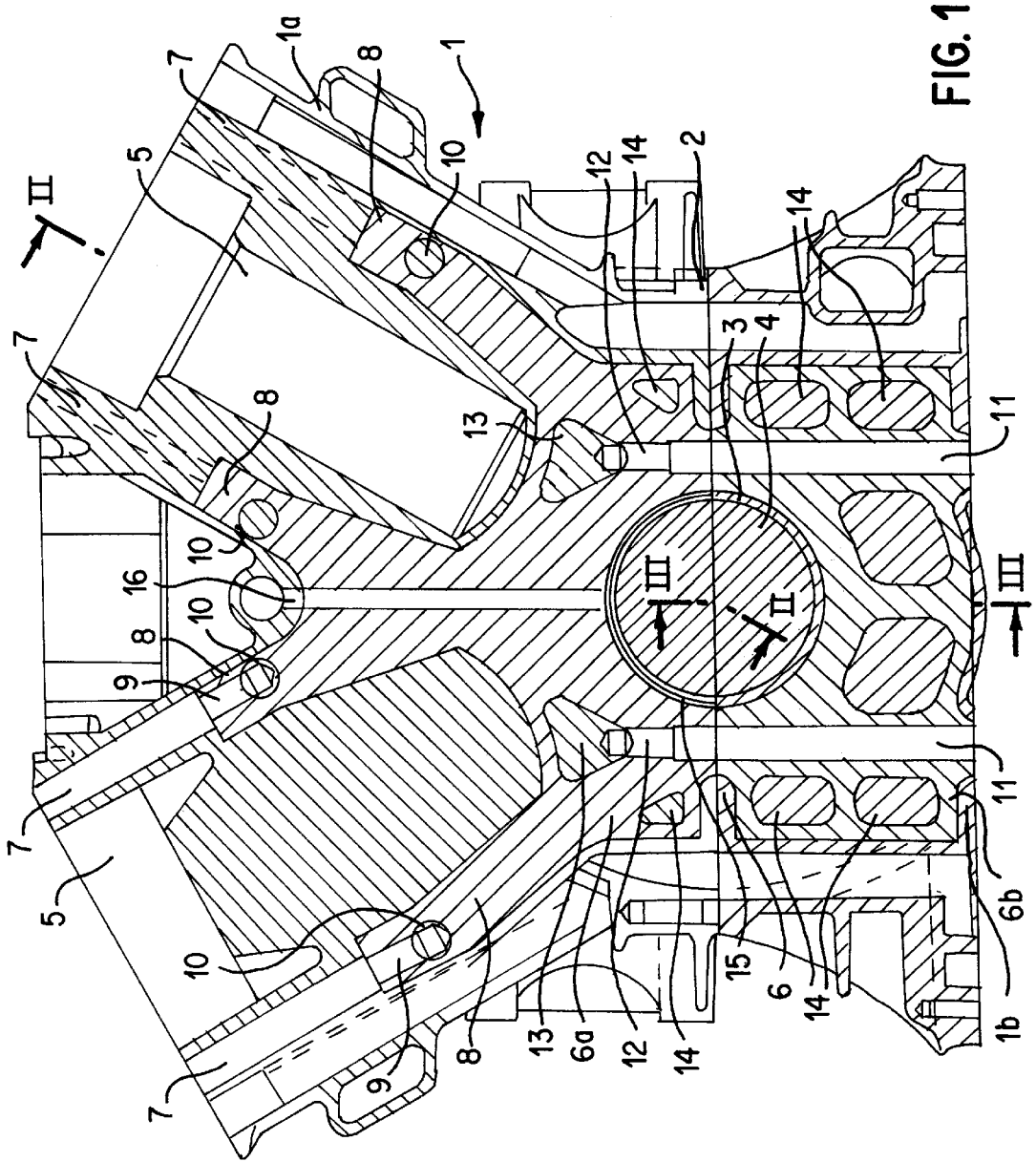
FIG. 1 is a cross-sectional front view of a crankcase according to the invention.

According to FIG. 1, a crankcase designed generally by numeral 1 is formed of a crankcase top section 1a and of a crankcase bottom section 1b. At the level of a parting plane 2 between the crankcase top section 1a and the crankcase bottom section 1b, a bearing point for a crankshaft 4 is constructed as a bearing bore 3.

Figure 2:
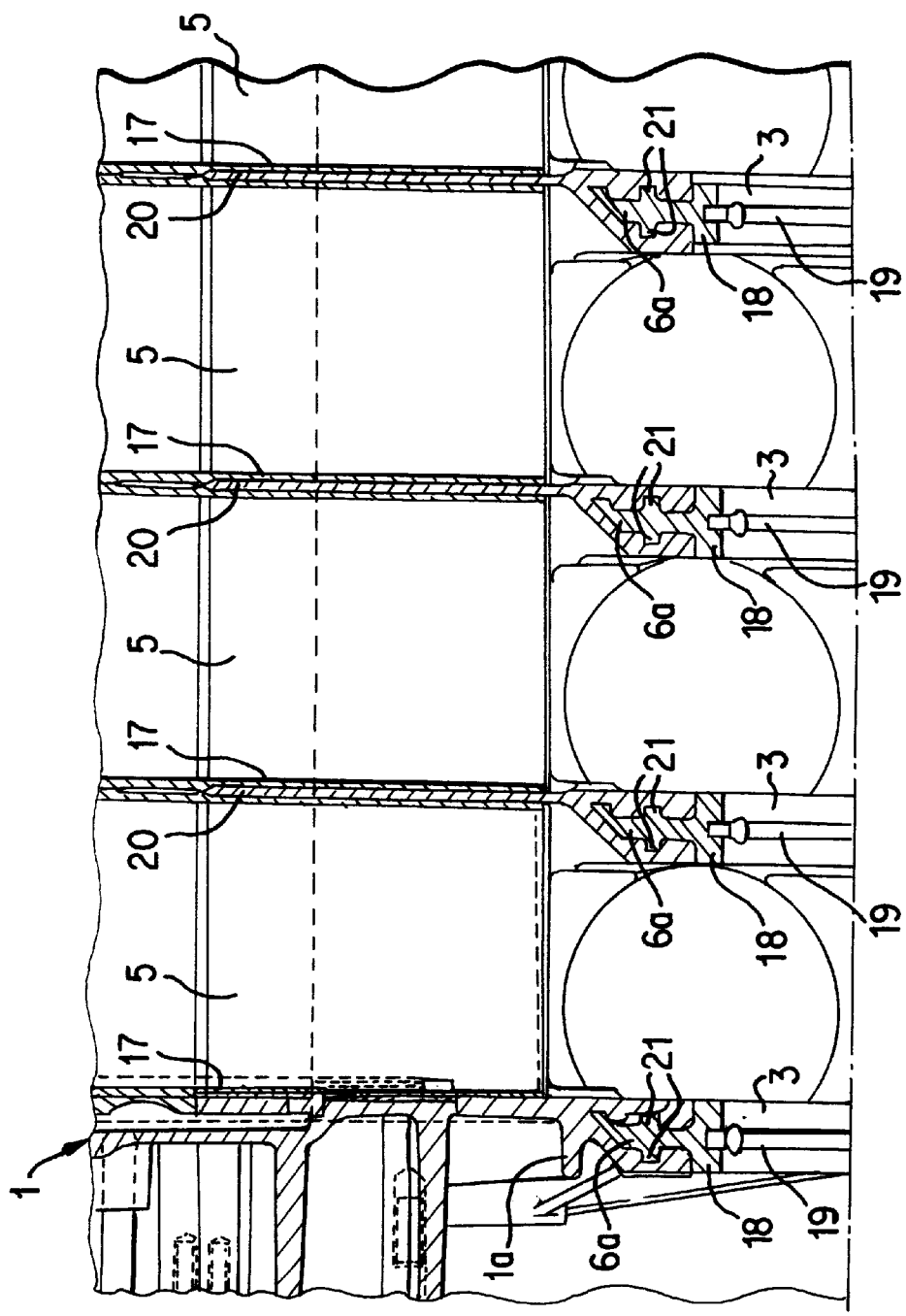
FIG. 2 is a sectional view along line II—II of FIG. 1.

On the side away from the bearing bore 3, cylinders 5 are situated in the crankcase top section 1a which in this case is constructed for a V-type internal-combustion engine. In the illustrated embodiment, several cylinders 5 are arranged in the longitudinal direction of the crankcase 1 as seen in FIG. 2. The crankcase 1 therefore also has several bearing points 3. As a rule, the number of bearing points 3 is always by one higher than the number of cylinders 5 per cylinder bank.

The following description of the crankcase 1 relates to a V-type internal-combustion engine having twelve cylinders 5. Of course, it is to be clearly understood that the crankcase 1 can also be applied without any problem to an internal-combustion engine with a lower or larger number of cylinders or in the case of an internal-combustion engine of the in-line construction within the scope of the present invention.

In the crankcase 1, cast-in parts 6 are arranged such that upper cast-in parts 6a are situated in the material of the crankcase top section 1a and lower cast-in parts 6b are situated in the material of the crankcase bottom section 1b. The lower cast-in parts 6b extend from the parting plane 2 to the underside of the crankcase bottom section 1b. The upper cast-in parts 6a extend from the parting plane 2 past both cylinders 5 in a U-shape to bores 7 for cylinder head bolts (not shown), provided in the crankcase top section 1a. When both cylinders 5 are viewed, four branches 8 of the U-shaped regions of the upper cast-in parts 6a are obtained for each upper cast-in part 6a, and extend laterally past the cylinders 5, each of the branches 8 being provided with threaded bores 9 for receiving the cylinder head bolts. The threaded bores 9 are aligned with the bores 7 of the crankcase top section 1a.

In the region of the respective thread run-outs of the threaded bores 9, hollow spaces 10 are situated in the upper cast-in parts 6a. The material of the crankcase top section 1a flows in the hollow spaces 10 during the manufacturing of the crankcase 1. The hollow spaces 10 are formed in a known manner by cores in the mold for the upper cast-in parts 6a. On one hand, this results in a clamping of the crankcase top section 1a to the upper cast-in parts 6a and, on the other hand, it permits a reduction of the tensions at the thread run-outs of the threaded bores 9. In the description of the materials for the crankcase top section 1a and the upper cast-in parts 6a, the significance of the hollow spaces 10 will be discussed in greater detail.

In order to be able to connect the crankcase top section 1a with the crankcase bottom section 1b, several bores 11 are situated in the lower cast-in parts 6b. The bores 11 extend over the parting plane 2 into the upper cast-in parts 6a and end there in threaded bores 12. Through the bores 11 and the threaded bores 12, the crankcase top section 1a can be connected with the crankcase bottom section 1b by means of main bearing bolts (not shown) in a known manner. As a result of the described construction and arrangement of the threaded bores 9, 12, a force guiding is obtained in the upper cast-in parts 6a from the threaded bores 9 for the cylinder head bolts by way of the branches 8 to the bearing bore 3 and the threaded bores 12 for the main bearing bolts.

Hollow spaces 13, in which the material of the crankcase top section 1a flows, are situated at the thread run-outs of the threaded bores 12, as with the threaded bores 9, in the branches 8. For clamping the crankcase 1 with the cast-in parts 6, additional hollow spaces 14 for the material of the crankcase 1 are distributed over the cross-section of the cast-in parts 6.

Two-part bearing shells 15 of known construction, are situated in the bearing bore 3 for receiving and supporting the crankshaft 4 in the appropriate manner. Also, main lubricating oil bores 16, which are also generally known, are situated in the crankcase top section 1a, the upper cast-in parts 6a and the bearing shells 15 for supplying the crankshaft 4 with lubricating oil at the bearing points 3.

FIG. 2 is a sectional view of the crankcase top section 1a, in which bushes 17 for pistons are provided in the cylinders 5. The bushes 17 may be constructed of any material representing a suitable tribological partner for the pistons.

The construction of the upper cast-in parts 6a in the region of the bearing bore 3 is also illustrated in FIG. 2. Thus, in the region around the bearing bore 3 and around the bearing shells 15 shown in FIG. 1, the upper cast-in parts 6a are provided with axial widenings 18 for representing a larger bearing surface for the crankshaft 4 and the bearing shells 15. In the widenings 18, surrounding lubricating grooves 19 are situated which are connected with the main lubricating oil bore 16 for supplying oil to the crankshaft 4.

FIG. 2 also shows that, between each cylinder 5 in which the crankcase top section 1a forms a separating wall 20, an upper cast-in part 6a is situated in the crankcase top section 1a. However, the upper cast-in parts 6a are not connected with one another in the axial direction but are constructed as separate, mutually spatially separated members. Thus, tensions which may arise from different thermal expansions of the cast-in parts 6, of the crankcase 1 and of the crankshaft 4 cannot cross over from one cast-in part 6 to another cast-in part 6. Thereby a deformation of the entire crankcase 1, as well as of the bearing bore 3, can be prevented.

Figure 3:
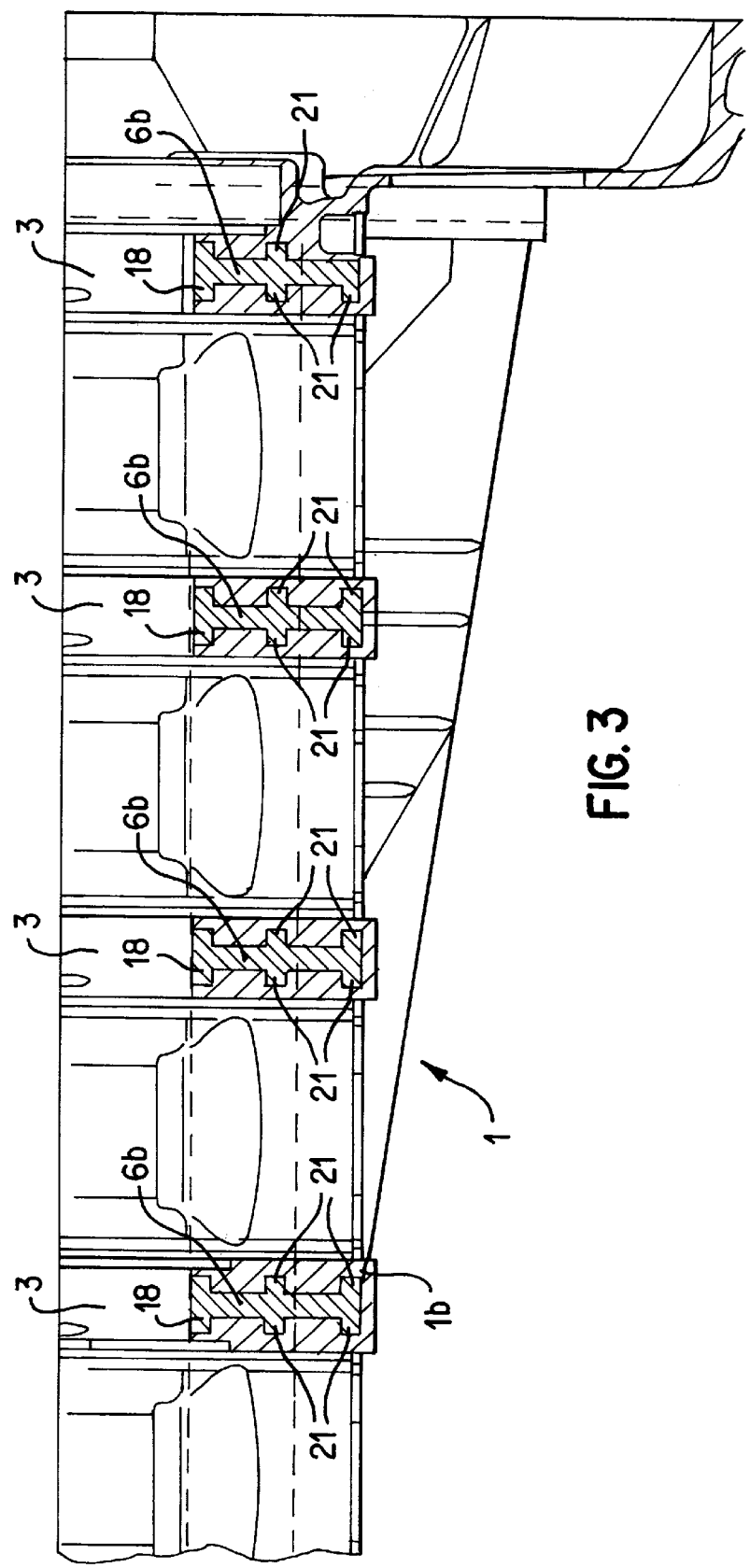
FIG. 3 is a sectional side view along line III—III of FIG. 1.

FIG. 3 shows the construction of the lower cast-in parts 6b which are also provided with axial widenings 18 in the region of the bearing bore 3. Of course, the lower cast-in parts 6b are aligned with the upper cast-in parts 6a. In general, the cast-in parts 6 have a thickness of approximately 3–4 mm, but circular widenings are provided on the threaded bores 9, 12, as well as on the main lubricating oil bore 16, in order to permit the production of the bores 9, 12 and 16 with the respective required diameters. According to FIGS. 2 and 3, the cast-in parts 6 also have projections 21 which contribute to better clamping of the crankcase 1 to the cast-in parts 6. Instead of the projections 21, recesses may be provided on the cast-in parts 6 in a manner which should now be clear to one skilled in this art.

A light metal, such as aluminum or magnesium, are selected in the currently preferred embodiment as the material for the crankcase 1. In contrast, the crankshaft 4 consists of an iron material whose coefficient of thermal expansion is much lower than that of the light metal for the crankcase 1. With respect to its coefficient of thermal expansion, the material for the cast-in parts 6 is selected such that it is closer to the coefficient of thermal expansion of the crankshaft 4 than to the coefficient of thermal expansion of the crankcase 1. Thus, because of the similar coefficients of thermal expansion between the cast-in parts 6 and the crankshaft 4, no thermal problems occur as the temperatures rise, particularly no distortion of the bearing bore 3.

In comparison to the material for the crankcase top section 1a and for the crankcase bottom section 1b, the material for the cast-in parts 6 has a relatively high modulus of elasticity for ensuring the required strength and stability of the whole crankcase 1. Furthermore, a high modulus of elasticity increases the stabilities of the threaded bores 9, 12, so that the bores can be constructed with smaller diameters and as relatively short fine threads. Hollow spaces 10, 13 are provided which extend perpendicularly to the axis of the threaded bores 9, 12 in order to shift the thread run-outs of the threaded bores 9 and 12 into the light metal material of the crankcase top section 1a. Thus, much lower tensions occur at the thread run-outs than in the material of the upper cast-in parts 6a which has a much higher modulus of elasticity.

Gray cast iron, such as GGV or GGG 50–70, can be used as materials for the cast-in parts 6. The crankcase top section 1 and the crankcase bottom section 1b are then constructed of an aluminum material. If, in contrast, the crankcase top section 1a and the crankcase bottom section 1b are constructed of a magnesium material, the cast-in parts 6 can be constructed of an aluminum material, such as hypereutectic or spray-compacted aluminum. In principle, all conceivable combinations are possible so that, as the result of an adaptation of the coefficients of thermal expansion to the crankshaft 4, thermal problems can be avoided.

The following process for manufacturing the crankcase 1 can be carried out. For each bearing point 3, an upper cast-in part 6a is placed on recesses provided for this purpose into a casting mold for the crankcase top section 1a. The material for the crankcase top section 1a is cast around the upper cast-in part 6a. The corresponding lower cast-in part 6b for each bearing point 3 is placed into a casting mold for the crankcase bottom section 1b. The material for the crankcase bottom section 1b is then cast around the lower cast-in part 6b. The crankcase 1 is clamped to the cast-in parts 6 through the above-described hollow spaces 10, 13 and 14. The halves of the crankcase 1 which are produced by the casting are then cut in a known manner, are provided with bearing shells 15 and finally are connected with one another at the bores 11 by main bearing bolts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A crankcase for an internal-combustion engine, comprising a crankcase bottom section made of a light-metal material, a crankcase top section made of a light-metal material, bearing points for a crankshaft, at least one cylinder, and cast-in parts which in a region of the bearing points for the crankshaft are cast in the crankcase bottom section and in the crankcase top section, wherein the cast-in parts comprise a material with a higher modulus of elasticity and a lower coefficient of thermal expansion than the light-metal material for the crankcase bottom section and the crankcase top section, and the cast-in parts for each bearing point are comprised of separate, spatially mutually separated members.

2. The crankcase according to claim 1, wherein lower cast-in parts are cast into the crankcase bottom section, and upper cast-in parts are cast into the crankcase top section.

3. The crankcase according to claim 2, wherein the cast-in parts have axial widenings in the region of the bearing points for receiving bearing shells.

4. The crankcase according to claim 2, wherein the upper cast-in parts are U-shaped in a region of the at least one cylinder with two branches of the U-shaped upper cast-in parts having threaded bores for cylinder head bolts.

5. The crankcase according to claim 4, wherein the cast-in parts have axial widenings in the region of the bearing points for receiving bearing shells.

6. The crankcase according to claim 4, wherein a hollow space is arranged in the upper cast-in parts in a region of thread run-out of the threaded bores, in which hollow space is situated the material of the crankcase top section.

7. The crankcase according to claim 4, wherein the upper cast-in parts have threaded bores for main bearing bolts, and the lower cast-in parts have passage bores for the main bearing bolts.

8. The crankcase according to claim 7, wherein the cast-in parts have axial widenings in the region of the bearing points for receiving bearing shells.

9. The crankcase according to claim 8, wherein a hollow space is arranged in the upper cast-in parts in a region of thread run-out of the threaded bores, in which hollow space is situated the material of the crankcase top section.

10. The crankcase according to claim 7, wherein a hollow space is arranged in the cast-in parts in a region of the thread run-outs of the threaded bores for the main bearing bolts, in which hollow space is situated the material of the crankcase top section.

11. The crankcase according to claim 4, wherein the upper cast-in parts have widenings in the region of the threaded bores for the main bearing bolts and for the cylinder head bolts, and the lower cast-in parts have widenings in the region of the passage bores for the main bearing bolts.

12. The crankcase according to claim 5, wherein the upper cast-in parts have widenings in the region of the threaded bores for the main bearing bolts and for the cylinder head bolts, and the lower cast-in parts have widenings in the region of the passage bores for the main bearing bolts.

13. The crankcase according to claim 7, wherein the upper cast-in parts have widenings in the region of the threaded bores for the main bearing bolts and for the cylinder head bolts, and the lower cast-in parts have widenings in the region of the passage bores for the main bearing bolts.

14. The crankcase according to one of claim 1, wherein the cast-in parts have a modulus of elasticity and a coefficient of thermal expansion which are situated in a range of the modulus of elasticity and of the coefficient of thermal expansion of the crankshaft.

15. The crankcase according to claim 14, wherein the cast-in parts are formed of gray cast iron, and the crankcase top section and the crankcase bottom section are formed of an aluminum material.

16. The crankcase according to claim 1, wherein the cast-in parts are formed of an aluminum material with a high modulus of elasticity, and the crankcase top section and the crankcase bottom section are formed of a magnesium material.

17. A process for manufacturing a crankcase of an internal combustion engine having a crankcase bottom section made of a light-metal material, a crankcase top section made of a light-metal material, bearing points for a crankshaft, at least one cylinder, and cast-in parts which in a region of the bearing points for the crankshaft are cast in the crankcase bottom section and in the crankcase top section, wherein the cast-in parts are constructed of a material with a higher modulus of elasticity and a lower coefficient of thermal expansion than the light-metal material for the crankcase bottom section and the crankcase top section, and the cast-in parts are constructed for each bearing point as separate, spatially mutually separated members, comprising the steps of placing upper cast-in parts and lower cast-in parts in a casting mold for the crankcase top section and in a casting mold for the crankcase bottom section for each bearing point of the crankshaft, and casting the material for the crankcase top section and for the crankcase bottom section around the upper and lower cast-in parts.

\* \* \* \* \*